United States Patent
Concion et al.

(10) Patent No.: US 7,369,613 B2
(45) Date of Patent: May 6, 2008

(54) PROCESS FOR THE FORMAT CONVERSION OF MPEG BITSTREAMS, A SYSTEM AND COMPUTER PROGRAM PRODUCT THEREFOR

(75) Inventors: Davide Concion, Monticello Conte Otto (IT); Emiliano Piccinelli, Monza (IT); Danilo Pau, Sesto San Giovanni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1337 days.

(21) Appl. No.: 10/243,081

(22) Filed: Sep. 12, 2002

(65) Prior Publication Data

US 2003/0090591 A1 May 15, 2003

(30) Foreign Application Priority Data

Sep. 14, 2001 (EP) .................................. 01830589

(51) Int. Cl.
*H04N 7/12* (2006.01)
*H04N 11/02* (2006.01)

(52) U.S. Cl. .............................. 375/240.2; 375/240.21; 375/E7.248

(58) Field of Classification Search ........... 375/240.18, 375/240.2, 240.21; 348/441, 14.12; 382/248, 382/250, 264, 299; 358/1.2, 3.07
See application file for complete search history.

(56) References Cited

U.S. PATENT DOCUMENTS

| | | | | |
|---|---|---|---|---|
| 5,262,854 | A * | 11/1993 | Ng .......................... | 375/240.24 |
| 6,434,275 | B1 * | 8/2002 | Fukuda et al. ............... | 382/275 |
| 6,671,322 | B2 * | 12/2003 | Vetro et al. ............. | 375/240.16 |
| 6,868,188 | B2 * | 3/2005 | Skodras et al. ............. | 382/250 |
| 7,266,148 | B2 * | 9/2007 | Kim ...................... | 375/240.03 |

(Continued)

FOREIGN PATENT DOCUMENTS

WO     WO 00/00907     1/2000

(Continued)

OTHER PUBLICATIONS

Mervah, N. et al., "Fast Algorithms for DCT-Domain Image Down-Sampling and for Inverse Motion Compensation," *IEEE trans on Circuits and Systems for Video Technology*, 7(3):468-476, Jun. 1997.

(Continued)

*Primary Examiner*—Gims Philippe
*Assistant Examiner*—Erik Rekstad
(74) *Attorney, Agent, or Firm*—Lisa K. Jorgenson; E. Russell Tarleton; Seed IP Law Group PLLC

(57) ABSTRACT

A process for format conversion of DCT macroblocks in an MPEG video bitstream that are divided into blocks, each of which includes a plurality of microblocks. In each DCT block, the significant frequencies are identified and preserved, isolating a corresponding microblock preferably consisting of the microblock on the top left of each block and setting to zero the coefficients of the remaining microblocks. On the microblock thus isolated there is performed an inverse discrete cosine transform, and the microblock thus obtained is merged with the homologous microblocks obtained from the other blocks comprised in a respective starting macroblock, so as to give rise to a merging block. The merging block thus obtained undergoes a discrete cosine transform so as to obtain a final block, which can be assembled into a macroblock with converted format.

17 Claims, 5 Drawing Sheets

U.S. PATENT DOCUMENTS

2002/0090028 A1* 7/2002 Corner et al. ............ 375/240.2
2004/0126021 A1* 7/2004 Sull et al. .................. 382/233
2005/0069224 A1* 3/2005 Nowicki et al. ............ 382/298

FOREIGN PATENT DOCUMENTS

WO     WO 00/51357     8/2000

OTHER PUBLICATIONS

Kim, D. et al., "Trancoding DV into MPED-2 in the DCT Domain," in *Proceedings of the IS&T/SPIE Conf. on Visual Communications and Image Processing*, San Jose, CA, Jan. 1999.

Dugad, R. et al., "A Fast Scheme for Image Size Change in the Compressed Domain," *IEEE Trans. on Circuits and Systems for Video Technology*, 11(4):461-474, Apr. 2001.

* cited by examiner

PROCESS FOR THE FORMAT CONVERSION OF MPEG BITSTREAMS, A SYSTEM AND COMPUTER PROGRAM PRODUCT THEREFOR

BACKGROUND OF THE INVENTION

1. Field of the Invention

The present invention relates to the processing of bitstreams encoded according to the MPEG standard, and more particularly to the format conversion of MPEG bitstreams.

2. Description of the Related Art

The MPEG (Moving Pictures Experts Group) standard proposes a set of algorithms dedicated to the compression of sequences of digital (audio/video) signals. The techniques used are based on the reduction in spatial and temporal redundancy of the sequence.

According to the MPEG standard, reduction in spatial redundancy is obtained by independently compressing the individual images, using a discrete cosine transform (DCT), quantization, and Huffman coding.

Reduction in temporal redundancy is obtained by exploiting the correlation that exists between successive and/or temporally close images in the sequence. Approximately, it is assumed that each portion of an image could be expressed locally as the translation of a portion of a previous and/or subsequent image in the sequence.

The foregoing corresponds to criteria that are well known to the prior art and hence are such as not to require further illustration herein.

In the actual use of the MPEG standard it is possible to transmit (or record) films, or in general video sequences, on a variety of channels and media, each of which has its own characteristics of capacity, speed and cost.

The transmission of a film (or of a video program in general) starting from the master recording may be done, for instance, on DVD media, via satellite, radio antenna, cable, and—to an ever-increasing extent—via telematic networks, such as Internet, and/or to mobile terminals, such as UMTS mobile terminals.

In order to make available a wide range of the aforementioned transmission modalities and to expand it even further, it is necessary to be able to adapt the characteristics of the MPEG bitstream to the transmission/storage channel, as well as to the characteristics of the display units employed to display the corresponding images.

The foregoing entails, among other things, the need to convert the format of an MPEG video bitstream in such a way that the resulting sequence is reduced, for example, to one quarter of the original format.

In order to obtain the above result, it is possible, for example, to apply the "canonical" solution represented in FIG. 1.

In the case of FIG. 1, an input MPEG video bitstream, designated by IS, is entered into a decoder 100, which is able to read and decode the bitstream IS with a format corresponding to a number of pixels Hor×Vert per image.

The signal thus decoded is fed to a set of downsampling filters 120 which are able to downsample the image starting from the original format Hor×Vert to a reduced format (Hor/N)×(Vert/M).

The signal thus subjected to conversion of format is entered into an encoder 140, which is able to generate a syntax in compliance with the MPEG standard, in view of its being sent on to a transmission/storage channel C and received in a decoder 160.

The decoder 160 is able to read and decode an MPEG bitstream with a number of pixels (Hor/N)×(Vert/M) per image, hence one with a reduced format, generating at output a corresponding video sequence OS.

The above technique in effect entails a conversion of the original MPEG bitstream (irrespective of whether this is in compliance with the MPEG2 specification or with the MPEG4 specification) into dec sequence of frames. The change of resolution is based upon a filtering action—this being preferably a finite-impulse-response (FIR) filtering—which is able to bring about a conversion based upon the availability of a certain number of pixels for each component of luminance and chrominance of the image. The pixels in question are multiplied by appropriate weights, and the results are accumulated and divided by the sum of said weights.

Certain pixels are not transmitted in the resulting image, depending upon the factor of change of resolution chosen. For this reason, starting from a bitstream decoded with an arbitrary bitrate B1, it is always possible to obtain a bitstream of bitrate B2 by simply connecting the output of the decoder to the input of the change-of-resolution block. The output of the latter is then connected to the input of the decoder, which can be programmed in such a way as to encode the signal at bitrate B2 and then transmit it to the decoder.

The above solution, which may be defined as an explicit transcoding, presents the fundamental drawback due to the computational complexity linked to its implementation, a computation complexity which renders the solution in question far from attractive in general and in any case unacceptable in those applicational contexts in which a sufficient processing capacity is not available.

A solution that is alternative to the canonical approach examined previously is described in the European patent applications Nos. 01830084.8 and 01830227.3, both in the name of the present applicant.

The above alternative solution is based upon a "transcoding" process which makes it possible to convert the format, i.e., change the resolution, by operating in the domain of the discrete cosine transform (DCT) of the prediction error. In this way, it is possible to reduce considerably the computational complexity of the operation of format conversion, thus reducing accordingly the implementational complexity.

In order to achieve a correct anti-aliasing filtering function, it is in any case necessary to resort to linear-filtering techniques, which require, as is known from the theory of digital filtering, the availability of a certain number of coefficients surrounding the ones that are being processed, the aim being to eliminate, or at least reduce as far as possible, edge effects.

BRIEF SUMMARY OF THE INVENTION

The disclosed embodiments of the present invention provide a solution for conversion of format implemented operating in the DCT domain that is able to overcome the intrinsic constraint of the known solutions referred to previously.

The invention also relates to the corresponding system, as well as to the corresponding computer program product that can be loaded directly into the memory of a digital computer and that comprises portions of software code adapted to perform the process according to the invention when the computer program product is run on a digital computer.

The solution according to the invention makes it possible to obtain, in the discrete cosine transform (DCT) domain, block downsampling of an MPEG video bitstream in such a way that the resulting sequence is reduced, for example, to one quarter of the original format.

The solution according to the invention is characterized by its ease of implementation and by the corresponding reduction in computational complexity and in the resulting expenditure of storage space, without this being in any way prejudicial to the quality of the final result.

The solution according to the invention is therefore proposed as an alternative solution both with respect to frequency conversion performed in the pixel domain by means of FIR pre-filtering and decimation, and with respect to the implementation by means of filtering in the DCT domain.

In order to achieve the above purpose, obtaining results that are superior or at least equivalent to those of the solutions according to the prior art, the solution according to the invention adopts a non-linear technique for anti-aliasing filtering.

BRIEF DESCRIPTION OF THE SEVERAL VIEWS OF THE DRAWINGS

The invention will now be described, purely by way of non-limiting example, with reference to the annexed drawings, in which.

DETAILED DESCRIPTION OF THE INVENTION

As previously described, the conversion of video signal format usually involves anti-aliasing low-pass filtering and subsequent decimation of the filtered pixels.

Operating in the DCT domain, which is typical of the MPEG standard, the blocks of pixels (usually of size 8×8) are broken down into the equivalent spatial sequences in order to reduce the number of representative coefficients (which may vary according to the bitrate).

In this way the visibility of the individual pixels is lost, and consequently the low-pass filtering and decimation are carried out on the individual frequencies.

The variance of the DCT coefficients, and hence their variability, decreases very rapidly with the frequencies. In order to reconstruct an image, it is sufficient to preserve only a relatively small set of terms concentrated around the d.c. coefficient (DC). In addition, it is known that the human eye is less sensitive to high frequencies than to low frequencies, and this implies that minor errors resulting from the elimination of the high frequencies end up not having any particular importance of a subjective nature.

Figure 2:
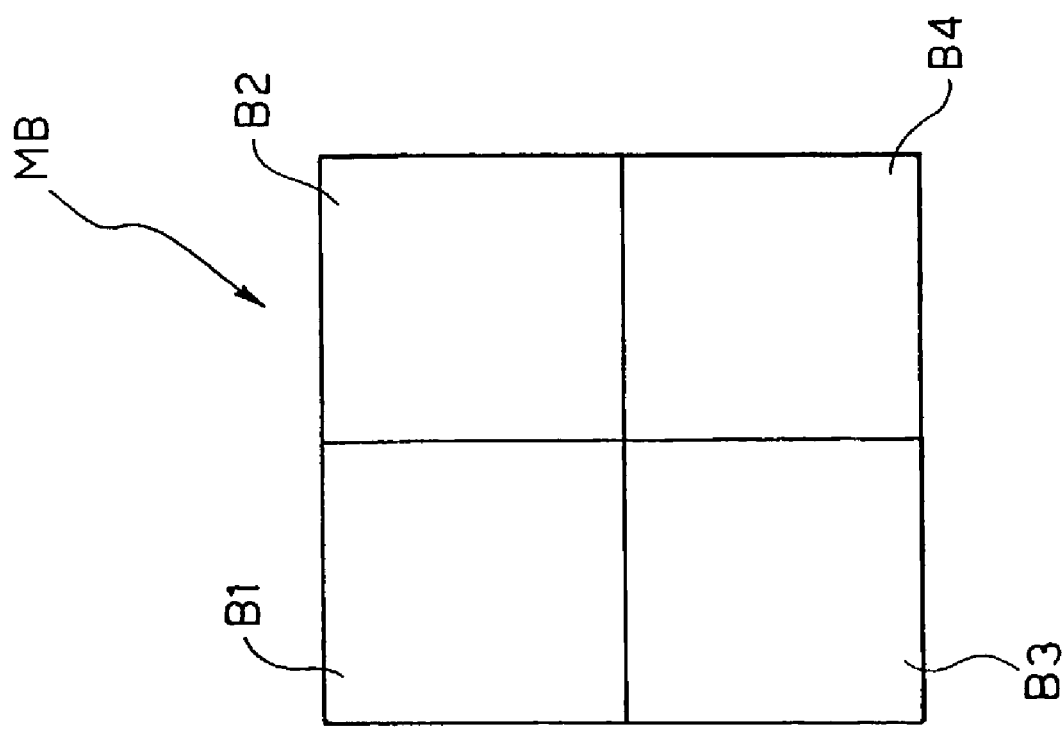

In the MPEG standard, the 8×8 DCT blocks are grouped together in sets of four in such a way as to give rise to 16×16 macroblocks. FIG. 2 illustrates a macroblock MB which groups together four blocks B1, B2, B3 and B4.

Reducing to one quarter the format of a video bitstream means reducing to one quarter each macroblock, i.e., passing from macroblocks to blocks.

In the final bitstream, the blocks obtained from downsampling are re-organized into 16×16 macroblocks. The overall number of macroblocks is hence reduced to one quarter between the input bitstream and the output bitstream.

The solution according to the invention envisages, in a preferred embodiment, performing the anti-aliasing filtering by exploiting a non-linear approach that chooses the frequencies of the source image that are to be preserved, eliminating the other frequencies. Eliminating a DCT coefficient means removing the energy corresponding to a given spatial sequential component (vertical, horizontal, vertical plus horizontal).

The low-pass filtering and decimation operations performed are thus organized into two steps.

The first step basically consists in identifying and preserving the frequencies that are deemed to be significant, eliminating the remaining frequencies. The said selection is carried out within each block B1, B2, B3 and B4 by means of a DCT-coefficient visibility mask applied to a 4×4 "microblock" and setting to zero the coefficients of the other three microblocks.

Figure 1:
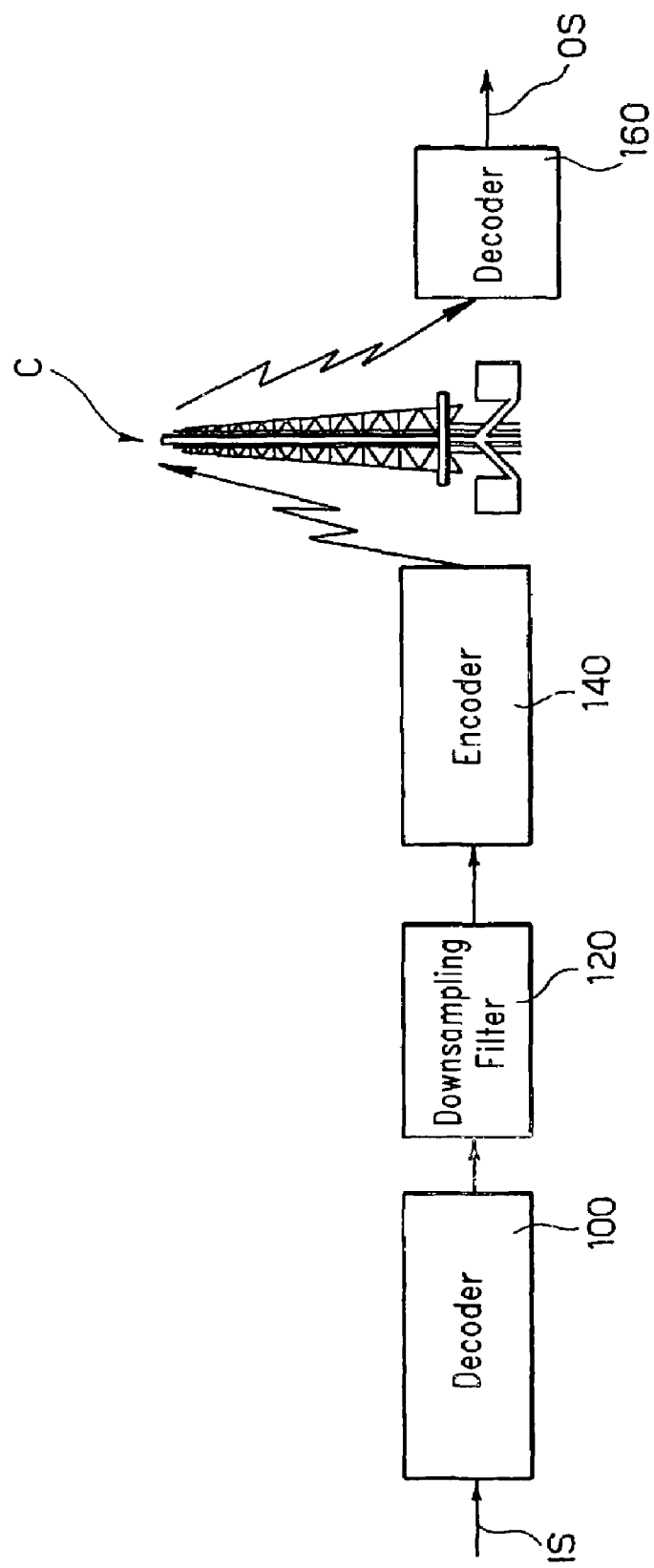
FIG. 1, which regards the prior art, has already been described previously.
Figure 3:
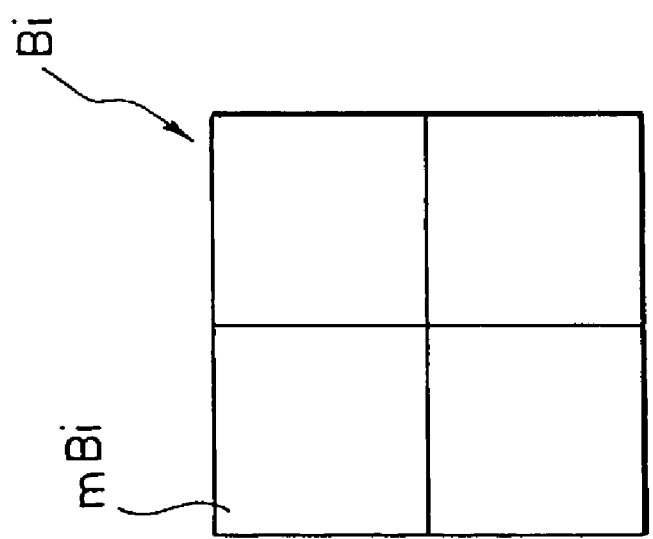
FIGS. 2 and 3 are schematic illustrations of the organization of the macroblocks and of the corresponding blocks in the framework of the MPEG standard, as well as of the definition of corresponding microblocks according to the invention.

FIG. 3 represents a generic block Bi, and the microblock selected, which is designated by mBi, is the one illustrated on the top left. The coefficients of the other three microblocks which occupy the positions on the bottom left, top right and bottom right are, instead, set to zero.

The second step basically consists of a decimation obtained by performing, on the microblock mB previously isolated, the inverse discrete cosine transform (IDCT), which is thus calculated on sixteen coefficients (4×4), and by performing division by an appropriate distortion factor. The IDCT applied to the 4×4 microblock makes it possible to shape further the dark-band spectrum wherever a higher degree of attenuation is encountered. The IDCT is repeated on the microblocks of the four blocks that are to be merged. The four microblocks resulting from the IDCT are gathered together in an 8×8 block to which the DCT is applied.

Figure 4:
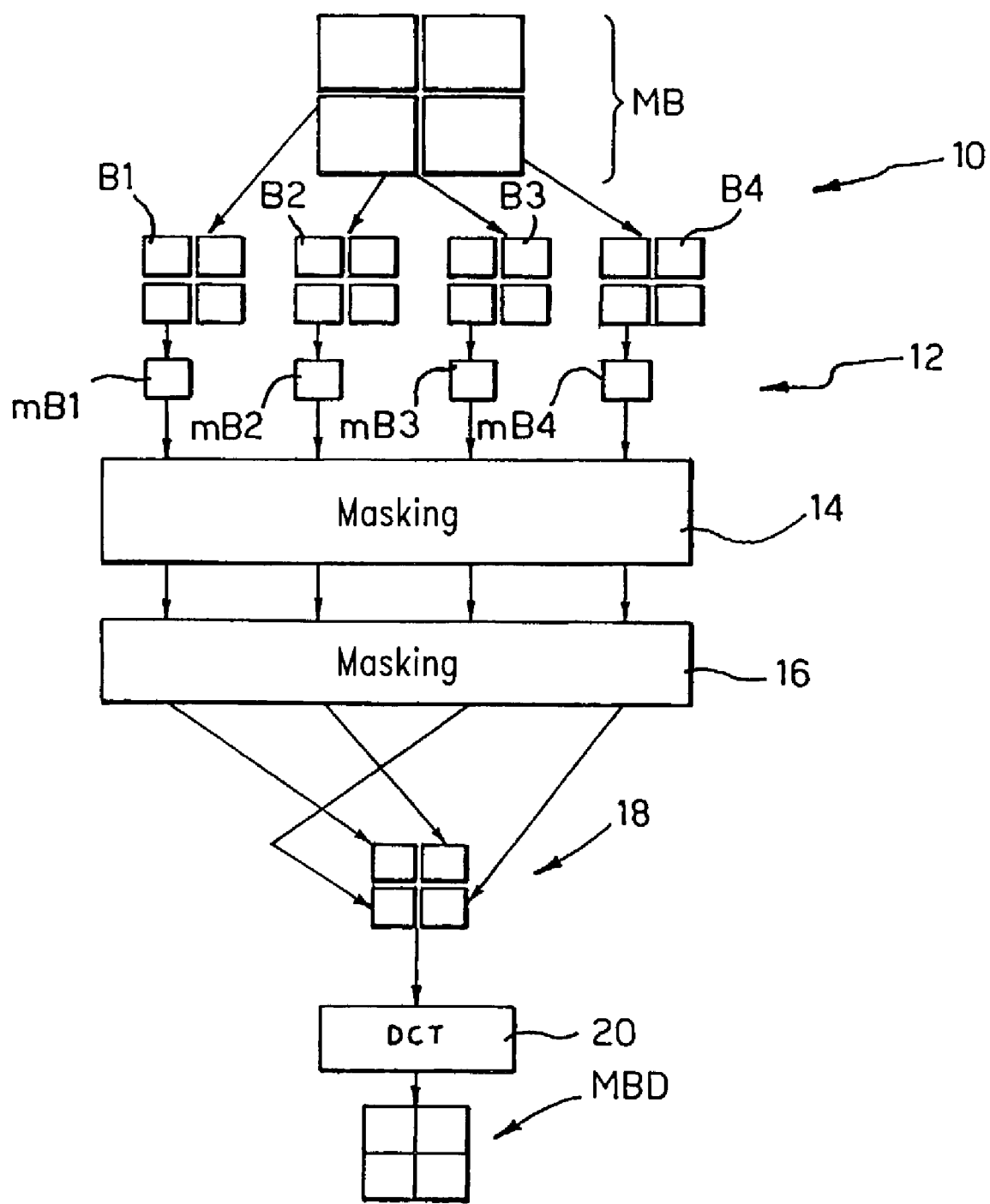
FIG. 4 is a block diagram illustrating the basic principle of the selection operation performed in the solution according to the invention.

The above operating sequence is schematically illustrated in the functional flowchart represented in FIG. 4.

In FIG. 4, MB designates the individual macroblock (this will generally be the i-th block in a video sequence) which is to be divided, in a step designated by 10, into four 8×8 blocks designated by B1, B2, B3 and B4.

In a step designated by 12, from each of the blocks B1, B2, B3, B4 a corresponding microblock mB1, mB2, mB3, mB4 is derived. This is done by selecting the 4×4 microblock on the top left—hence the one located in a position close to the d.c. component—according to the modalities described previously, namely setting to zero the coefficients of the other microblocks.

Figure 6:
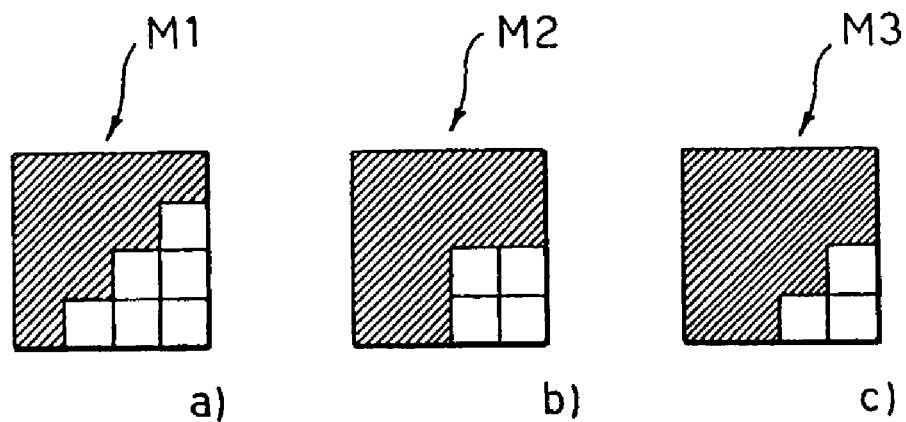
FIG. 6 illustrates a few examples of masking structures that may be used in the context of the present invention.

The steps designated by 14 and 16 respectively correspond to a possible masking action performed on each microblock mB1, mB2, mB3, mB4 (this may be done by means of masks, such as the masks M1, M2 or M3 which are illustrated in FIG. 6 and which will be described in greater detail hereinafter) and to execution of the IDCT on the microblocks mB1, mB2, mB3, mB4, after possible prior masking.

The reference number 18 designates the merging of the microblocks thus obtained into a single 8×8 block which, in the step designated by 20, is to undergo the DCT operation with a view to obtaining the final decimated block, designated by MBD.

Figure 5:
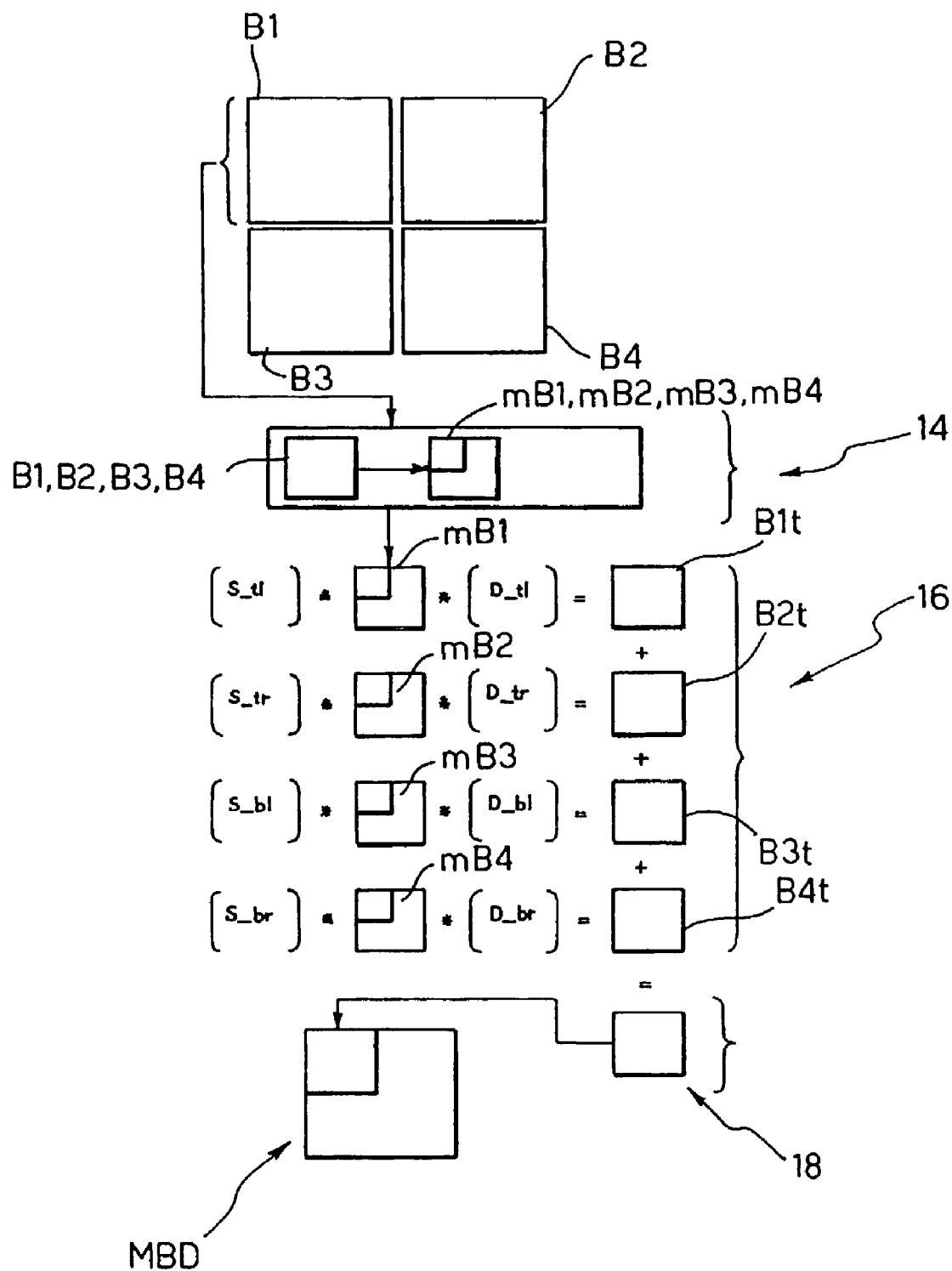
FIG. 5 is a functional block diagram illustrating the processing operations performed in the framework of a system according to the invention.

The diagram of FIG. 5 shows how the aforesaid operations may be implemented by means of appropriate matrix sums and multiplications, remaining in the DCT domain.

The solution according to the invention is therefore suited to being implemented—according to criteria that are within the reach of a person skilled in the branch on the basis of the detailed description of the invention provided herein— whether by using a specialized processor or by using a general-purpose digital computer (such as a digital signal processor—DSP) on which the computer program product according to the invention is run.

In particular, FIG. 5 considers a single macroblock MB of the four that are usually to be reduced simultaneously. Each 8×8 DCT block B1, B2, B3 and B4 deriving from the macroblock MB is processed in such a way as to preserve only the coefficients corresponding to the microblock mB1, mB2, mB3, mB4 in the top left-hand corner.

The microblock mB1, mB2, mB3, mB4 is then multiplied by appropriate matrices, on the right and on the left, according to the position of the block. All the matrices considered are of size 8×8 (hence of a rank higher than, namely twice, that of the microblocks to which they are applied) and, in the diagram of FIG. 5, they are respectively designated by S_tl, D_tl, S_tr, D_tr, S_bl, D_bl, S_br, D_br, where S stands for Sinister (left), D stands for Dexter (right), t stands for top, b stands for bottom, l stands for left, and r stands for right.

Four blocks are thus obtained, designated by B1t, B2t, B3t, B4t (temporary i-th blocks), the sum of which, designated by B1f, corresponds to the merging block of step 18 of FIG. 4 which has already undergone DCT (step 20 of FIG. 4). In this way it is possible to calculate the IDCT applying the calculation to the 4×4 microblocks (instead of the 8×8 blocks as would normally be the case), then performing the merging and the DCT of the resulting 8×8 block.

FIG. 6, which is divided into three parts designated by a), b) and c), represents three masking structures (with reference of course to a 4×4 microblock) which, once applied to the microblocks on the top left mB1, mB2, mB3, mB4 isolated from the blocks B1, B2, B3, B4, have yielded particularly satisfactory results from the qualitative standpoint. And this, even though the aforesaid masking action entails, in itself, setting to zero the other coefficients of the microblock, namely the coefficients corresponding to the positions appearing in white in the various masks M1, M2 and M3. It will, however, be appreciated that the masks illustrated in FIG. 6 are in any case such as to preserve the components that are closest to the d.c. coefficient (DC).

Of course, the solution described is not limited, as regards its possible applications, to the case alone of microblocks of size corresponding to 4×4 pixels (hence for a reduction to one quarter of the original spatial resolution), but may be generalized to arbitrary sizes of said microblocks.

Figure 7:
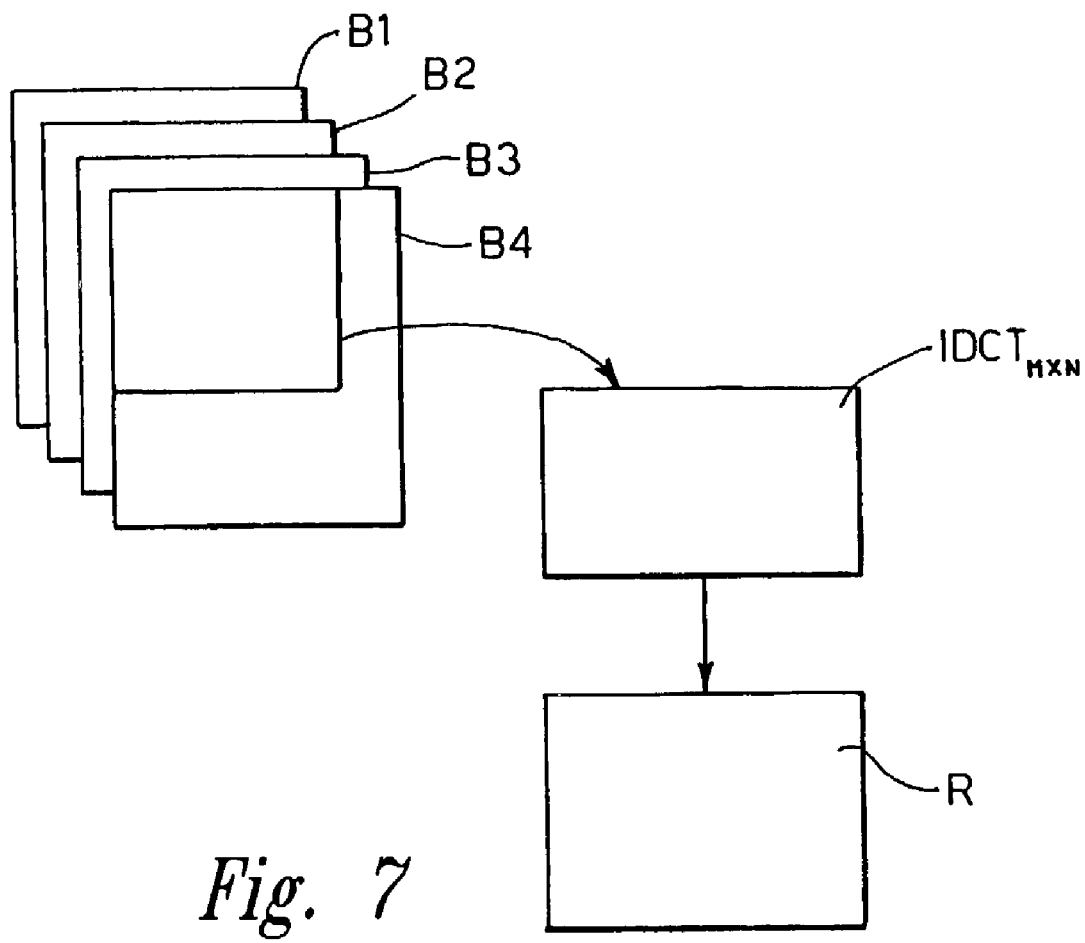
FIG. 7 is a diagram that synthesizes the principles underlying the invention.

In particular, with reference to the schematic representation of FIG. 7, it is possible to extract, from each block under examination belonging to a given macroblock (whatever the sizes of said macroblocks and said blocks), a microblock of arbitrary size M×N, provided that this size is smaller than that of the complete block. To each microblock it is then possible to apply the inverse discrete cosine transform $IDCT_{M \times N}$, finally proceeding to a reconstruction operation, generically designated by R, where a block of the same size as the original one is reconstructed.

Of course, without prejudice to the principle of the invention, the details of implementation and the embodiments may vary widely with respect to what is described and illustrated herein, without thereby departing from the scope of the present invention as defined in the annexed claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

The invention claimed is:

1. A process for converting the format of MPEG video bitstreams, comprising:

identifying DCT macroblocks in said bitstreams, each macroblock comprising a plurality of blocks;

dividing each of said DCT macroblocks into respective DCT blocks, each block in turn comprising a plurality of microblocks;

identifying and preserving, in each DCT block comprised in a DCT macroblock, the significant frequencies, isolating a corresponding microblock of said DCT block;

performing an inverse discrete cosine transform on the isolated microblock;

gathering said microblock, which has been isolated and subjected to an inverse discrete cosine transform, together with the homologous microblocks obtained from the other DCT blocks comprised in a respective macroblock, so as to obtain a merging block; and applying to said merging block the discrete cosine transform so as to obtain a final block that can be assembled into a macroblock with converted format;

wherein said operations of performing on the isolated DCT microblock an inverse cosine discrete transform, gathering said DCT microblock, which has been isolated and subjected to an inverse discrete cosine transform, with the homologous microblocks obtained from the other DCT blocks comprised in a respective DCT macroblock, and applying to said merging block the discrete cosine transform are carried out by multiplying said isolated microblock and said homologous DCT microblocks by respective multiplication matrices on the left and on the right, according to the position of the DCT block, so as to obtain respective temporary blocks and adding together said respective temporary blocks, the sum of said temporary blocks identifying said final block that can be assembled into a macroblock with converted format.

2. The process of claim 1, comprising the operation of identifying said DCT macroblocks as 16×16 macroblocks.

3. The process of claim 1 comprising the operation of dividing said DCT macroblocks into 8×8 DCT blocks.

4. The process of claim 1, comprising the operation of selecting said corresponding DCT microblock as a 4×4 microblock.

5. The process of claim 1, wherein said corresponding DCT microblock (is chosen in the area around the d.c. component of the respective DCT block.

6. The process of claim 1, wherein said corresponding DCT microblock is identified as the microblock on the top left-hand side of the respective DCT block.

7. The process of claim 1, wherein said multiplication matrices are of a rank higher than, and preferably twice, that of said isolated DCT microblock and said homologous microblocks.

8. The process of claim 1, comprising the operation of subjecting said corresponding DCT microblock to masking, using a mask that acts on a subset of the microblock itself.

9. The process of claim 1, wherein said operation of isolating said corresponding DCT microblock involves setting to zero the coefficients associated to the microblocks of said DCT block other than said corresponding DCT microblock.

10. The process of claim 1, wherein said inverse discrete cosine transform is calculated on sixteen coefficients.

11. The process of claim 1, comprising the operation of applying a distortion factor to the result of said inverse discrete cosine transform.

12. A system for converting the format of an MPEG video bitstream, comprising a dedicated computer circuit operating according to the process of claim 1.

13. A computer-readable medium encoded with a computer program representing instructions to cause a computer to perform the operations of claim 1 when said product is run on a computer.

14. A process for format conversion of DCT macroblocks in an MPEG video bitstream that are divided into DCT blocks, each of which includes a plurality of microblocks, the method comprising:

isolating a corresponding microblock that comprises the microblock on the top left of each DCT block;

setting to zero the coefficients of the remaining microblocks of each DCT block;

performing an inverse discrete cosine transform on the isolated microblock and merging the results with homologous microblocks obtained from the other DCT blocks comprised in the respective starting macroblock to form a merged block, comprising multiplying the isolated microblock and the homologous microblocks by respective multiplication matrices, on the left and on the right according to the position of the respective DCT block from which the isolated microblock is obtained; and performing a discrete cosine transform on the merged block to obtain a final block configured to be assembled into a macroblock with converted format.

15. The process of claim 14, wherein isolating a corresponding microblock comprises subjecting the corresponding microblock to masking using a mask that acts on a subset of the microblock.

16. The process of claim 14, wherein isolating the corresponding microblock comprises setting to zero the coefficients associated with the microblocks of the DCT block other than the isolated corresponding microblock.

17. The process of claim 14, comprising the operation of applying a distortion factor to the result of the inverse discrete cosine transform.

* * * * *

UNITED STATES PATENT AND TRADEMARK OFFICE
CERTIFICATE OF CORRECTION

PATENT NO. : 7,369,613 B2
APPLICATION NO. : 10/243081
DATED : May 6, 2008
INVENTOR(S) : Davide Concion et al.

It is certified that error appears in the above-identified patent and that said Letters Patent is hereby corrected as shown below:

Column 6
Lines 24-26, "identifying and preserving, in each DCT block comprised in a DCT macroblock, the significant frequencies, isolating a corresponding microblock" should read as -- identifying and preserving, in each DCT block comprised in a DCT macroblock, significant frequencies, isolating a corresponding microblock --

Column 6
Line 33, "together with the homologous microblocks obtained" should read as -- together with homologous microblocks obtained --

Column 6
Line 63, "DCT microblock (is chosen in the area around the d.c." should read as -- DCT microblock is chosen in the area around the d.c. --

Signed and Sealed this

Tenth Day of March, 2009

JOHN DOLL
*Acting Director of the United States Patent and Trademark Office*